Oct. 2, 1962 B. N. TORELL 3,056,256
AFTERBURNER CONTROL FOR A MULTISPOOL GAS TURBINE POWER PLANT
Filed May 7, 1956
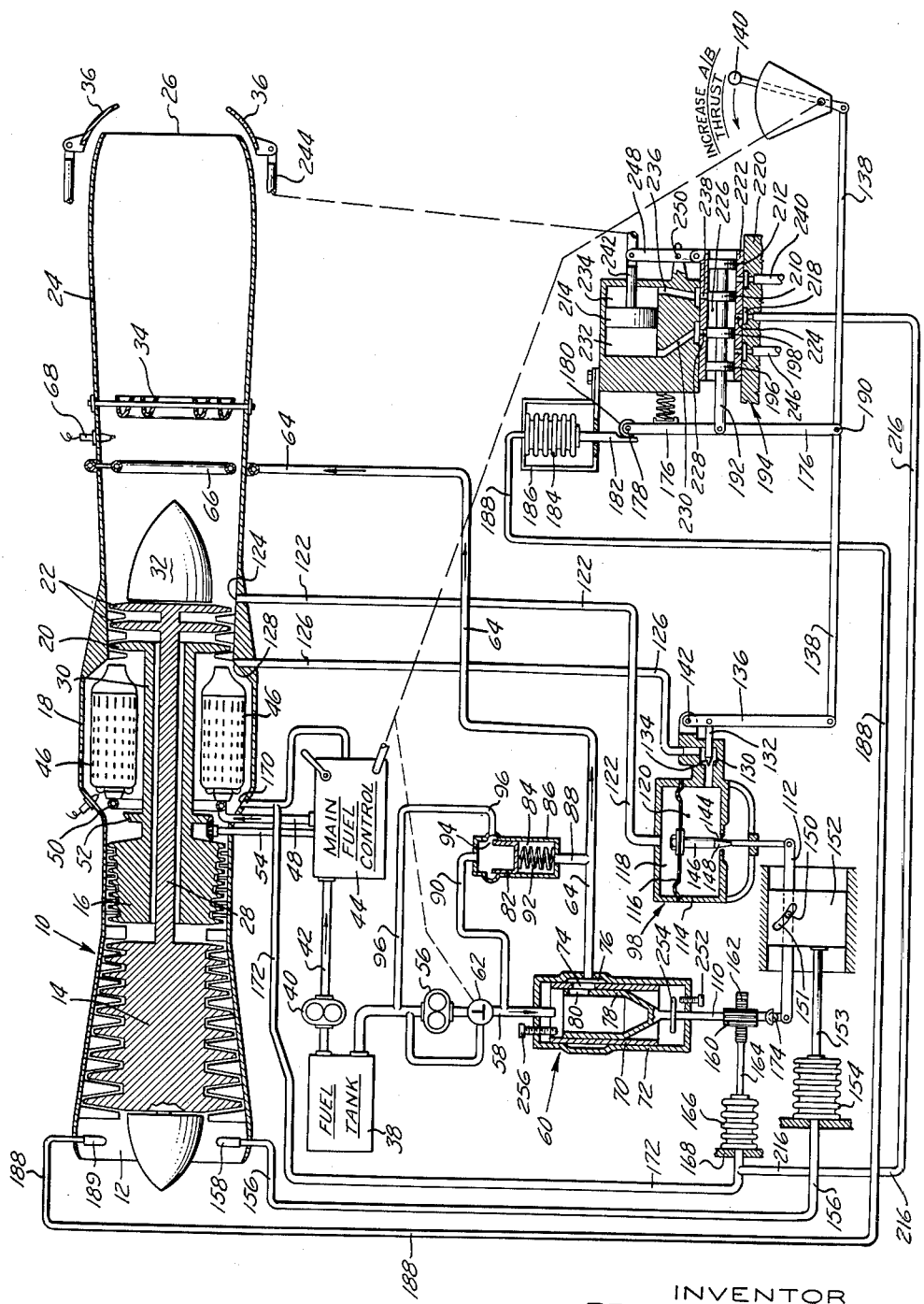
INVENTOR
BRUCE N. TORELL
BY
ATTORNEY

United States Patent Office 3,056,256
Patented Oct. 2, 1962

3,056,256
AFTERBURNER CONTROL FOR A MULTISPOOL GAS TURBINE POWER PLANT
Bruce N. Torell, Wethersfield, Conn., assignor to United Aircraft Corporation, East Hartford, Conn., a corporation of Delaware
Filed May 7, 1956, Ser. No. 583,026
3 Claims. (Cl. 60—35.6)

This invention relates to multispool, afterburning gas turbine power plants for aircraft, more particularly to an afterburner control which regulates afterburner fuel flow and exhaust nozzle area. Related inventions are disclosed in copending U.S. application Serial Nos. 556,275, Patent No. 2,984,969, 627,777, Patent No. 2,987,877, and U.S. application Serial No. 560,392, now U.S. Patent No. 2,921,433.

A multispool gas turbine power plant is one in which the compressor and the turbine are each split into a plurality of separate rotors, each rotor comprising one or more compressor or turbine stages. Each of the compressor rotors is connected to and driven by a turbine rotor, the unit forming what is called a spool. The various spools are coaxially arranged within the power plant. In a twin spool gas turbine power plant one or more of the downstream turbine stages are connected to and drive one or more of the upstream compressor stages, forming what is known as the low pressure spool since both the compressor stages and the turbine stages operate with gases at a lower pressure than the gases flowing through the remaining compressor and turbine stages. The remaining turbine stages are connected to and drive the remaining compressor stages, the unit surrounding the connection between the low pressure compressor and turbine stages and being known as the high pressure spool.

Fuel flow to a gas turbine power plant generally is metered as a function of the rotational speed of the compressor or turbine rotors, which in the case of most gas turbine power plants are connected together as a unit and rotate at the same speed. Multispool gas turbine power plants, however, have two or more spools which tend to rotate at various and independent speeds and only one spool speed is used as a signal to the main fuel meter or control. In the case of a twin spool power plant, it is customary, though not essential, to use the speed of the high pressure spool as a signal to the fuel control. This means that the speed of the low pressure spool is ungoverned and is controlled only through its unique relationship to the speed of the high pressure spool.

It is commonly the case with conventional twin spool power plants with fixed exhaust nozzle area that the speed of the low pressure spool is reduced as the temperature at the inlet to the low pressure compressor is increased, providing the speed of the high pressure spool is controlled to maintain a fixed turbine inlet temperature. This reduction in low pressure spool speed represents a loss in air flow through the power plant and, consequently, a loss in thrust which is not appreciable at subsonic air speeds, but which may reach values of 15 to 20 percent at low pressure compressor inlet temperatures corresponding to high speed supersonic flight. The speed of the low pressure spool can be controlled independently of the high spool speed by regulating the pressure ratio or the pressure drop of the gases across the low pressure turbine, or across both the low pressure and the high pressure turbines. This may be effected by varying exhaust nozzle area to increase or decrease the pressure downstream of the last turbine stage, thus bringing about a change in the pressure ratio or drop across the turbine and, consequently, a change in spool speed.

Flight at supersonic speeds is generally accomplished only during afterburning operation and as a result, increase of the pressure ratio or drop across the low pressure turbine for the purpose of holding the speed of the low pressure spool constant is needed only during afterburning operation. By varying exhaust nozzle area during afterburning operation as a function of low pressure compressor inlet temperature, speed regulation may be accomplished. It should be noted that for a power plant significantly affected by Reynolds number in the compressor, it may be desirable to also bias the exhaust nozzle area as a function of power plant inlet pressure, or any power plant pressure which is proportional to inlet pressure.

It also should be noted that the procedure for maintaining constant low pressure spool speed is effective in providing added thrust as airplane Mach number is increased only up to the point where the gain in thrust due to added airflow is not exceeded by the loss in thrust due to tailpipe losses. This generally occurs at a specific tailpipe Mach number and can in turn be related to the low pressure compressor inlet temperature. By stopping the increase of exhaust nozzle area above a specific value of the temperature, this loss of thrust is avoided.

It should be further noted that for some gas turbine power plants the procedure for maintaining constant low pressure spool speed over the full range of low pressure compressor inlet temperature up to the point of the tailpipe Mach number limitation is not desirable. For example, some power plants may have the flow area at the inlet to the low pressure compressor somewhat limited in which case inlet Mach number may become restrictive in the lower range of inlet temperature. For these power plants inlet Mach number can be directly related to corrected low pressure spool speed, i.e. to the ratio of actual low pressure spool speed to a unique function of low pressure compressor inlet temperature. Therefore, it would be desirable to vary the exhaust nozzle area of these power plants with low pressure compressor inlet temperature such that a constant corrected low pressure spool speed is not exceeded. The resultant increase of actual low pressure spool speed with an increase of inlet temperature would be continued as inlet temperature increased up to the point where the structural limit on the low pressure spool was reached. With further increase of low pressure compressor inlet temperature, exhaust nozzle area would be increased only as necessary to hold the speed of the low pressure spool at a constant actual value. This schedule would be followed until the tailpipe Mach number limitation was reached at which point exhaust nozzle area would be maintained at a constant value for all higher inlet temperatures.

For a power plant having a pressure ratio controller for selecting and maintaining a turbine pressure ratio through regulation of afterburner fuel flow, the pressure ratio must vary as a result of obtaining the above described variations of low pressure spool speed. In order to produce the variations, it is desired to bias the selected pressure ratio with low pressure compressor inlet temperature. A bias, therefore, for low pressure compressor inlet temperature is put into the pressure ratio controller so that afterburner fuel/air ratio is held essentially constant during the speed variations.

The foregoing discussion relates to the obtaining of maximum thrust from the power plant at supersonic speeds. In addition, it is desirable in some applications to be able to obtain a thrust somewhat less than the maximum with afterburning but somewhat greater than that available from the power plant without afterburning. It has commonly been the practice to obtain this reduction of thrust by reducing both the low pressure and high pressure spool speeds through reduction of fuel flow to the main combustion section. Such a method has the disadvantages of reducing cycle efficiency and reducing power plant air flow. The latter disadvantage is undesirable because of the relatively small air flow range over which current supersonic inlet diffusers will operate stably at any particular Mach number.

By reducing thrust through a reduction of the afterburner temperature rise, it is possible to maintain reasonably efficient operation without changing the speed of either spool or changing the air flow through the power plant. This can be accomplished by properly coordinating the reduction of exhaust nozzle area with a reduction of afterburner fuel flow or fuel/air ratio.

Under some circumstances it may be necessary to reduce thrust to a lower level than can be obtained solely by the foregoing procedure. This might be the case when the afterburner fuel flow has been reduced to the lean blowout limit. At this point, further reduction of thrust would be effected by selecting a lower speed for both the low and high pressure rotors.

An object of this invention, therefore, is to improve the operation of a multispool, afterburning gas turbine power plant.

Another object of the invention is to provide an afterburner control for an afterburning, multispool gas turbine power plant which enables maximum thrust to be obtained from the power plant at supersonic speeds.

Another object of the invention is to provide an afterburner control for an afterburning, multispool gas turbine power plant which enables operation of the power plant during partial afterburning without changing spool speed or airflow through the power plant.

Another object of the invention is to control afterburner operation of a multispool gas turbine power plant by manually scheduling exhaust nozzle area and at the same time selecting a turbine pressure ratio which is maintained substantially constant through regulation of afterburner fuel flow.

Still another object of the invention is to provide an afterburner control which manually schedules exhaust nozzle area, which automatically biases exhaust nozzle area as a function of compressor inlet temperature, and which regulates turbine pressure ratio through variation of afterburner fuel flow, automatically biased as a function of compressor inlet temperature, to control the actual speed of the low pressure spool in a twin spool gas turbine power plant.

Other objects and advantages will be apparent from the specification and claims, and from the accompanying drawing which illustrates an embodiment of the invention.

In the drawing:

The single figure shows an afterburner control in accordance with this invention in combination with a twin spool, afterburning gas turbine power plant for aircraft.

Referring to the drawing in detail, the gas turbine power plant is indicated generally at 10, the power plant having inlet 12, low pressure compressor rotor 14, high pressure compressor rotor 16, combustion section 18, high pressure turbine rotor 20, low pressure turbine rotor 22, afterburner 24, and exhaust nozzle 26 in succession in the direction of gas flow through the power plant. Compressor rotor 14 is connected to turbine rotor 22 by means of shaft 28 to form a low pressure spool. Compressor rotor 16 is connected to turbine rotor 20 by means of sleeve 30 to form a high pressure spool, the spool surrounding shaft 28 and being coaxial therewith. Exhaust cone 32 is mounted downstream of the last stage of turbine rotor 22 at the inlet to afterburner 24. The afterburner includes flameholder 34 and eyelids 36 for varying the area of exhaust nozzle 26.

Fuel is supplied to the power plant from tank 38. Fuel for combustion section 18 is pumped by pump 40 through conduit 42 to main fuel control 44. From here fuel is delivered to burner cans 46 in combustion section 18 through conduit 48 and annular manifold 50 connecting the burner cans. By means of gear 52 on sleeve 30 and gear shaft 54 connected to and driven by gear 52, main fuel control 44 meters fuel to combustion section 18 as a function of the speed of the high pressure spool and thus governs high pressure spool speed. A control for metering fuel flow to a gas turbine power plant as a function of speed as well as other power plant operating variables is shown in copending application Serial No. 337,995, filed February 20, 1953, now abandoned, for Fuel Control for Gas Turbine Power Plants.

Fuel for the afterburner is supplied from tank 38 by pump 56 through conduit 58 to afterburner fuel control 60. Valve 62 in conduit 58 controls the admission of fuel to the afterburner fuel system and is intended to admit fuel to the control and the afterburner only when afterburning operation of the power plant is desired. Fuel flows from afterburner fuel control 60 through delivery conduit 64 to annular manifold 66 mounted within afterburner 24 and from which the fuel is discharged into the afterburner. Spark plug 68 is provided for initiating combustion in the afterburner.

Afterburner fuel control 60 includes liner 70 fixed within casing 72, the liner having one or more rectangular ports 74 communicating through annular groove 76 in casing 72 with delivery conduit 64. A movable sleeve 78, having one or more rectangular ports 80 substantially in alignment with ports 74, fits within liner 70 and is both rotated and translated to regulate fuel flow to the afterburner by varying the effective area of ports 74 and 80. Fuel from conduit 58 flows into sleeve 78 and then passes successively through ports 80 and 74, groove 76, and conduit 64 to the afterburner.

For the purpose of making fuel flow to the afterburner solely a function of the effective area of metering ports 74 and 80, the pressure drop across the ports is maintained constant by a suitable device such as piston 82 within chamber 84 in casing 86. Conduit 88 connects delivery conduit 64 downstream of ports 74 and 80 with the lower end of chamber 84 to subject the bottom of piston 82 to afterburner fuel control outlet pressure. Conduit 90 connects inlet conduit 58 upstream of ports 74 and 80 with the opposite end of the chamber to subject the top of the piston to fuel control inlet pressure. Spring 92 assists the pressure from conduit 88 acting on the piston. In operation of the device, a variation in fuel pressure upstream or downstream of the metering ports results in movement of piston 82 to vary the effective area of orifice 94 and the quantity of fuel by-passed through conduit 96 to the inlet of pump 56.

Sleeve 78 in afterburner fuel control 60 is moved axially under the influence of pressure ratio controller 98, the controller being connected to stem 110 on the sleeve by link 112. Pressure ratio controller 98 includes casing 114 containing flexible diaphragm 116, the diaphragm defining chambers 118 and 120 within the casing. Chamber 118 is connected by conduit 122 to static pressure station 124 at the discharge side of turbine rotor 22, and chamber 120 is connected by conduit 126 to static pressure station 128 upstream of high pressure turbine rotor 20. Diaphragm 116 thus is responsive to the pressure differential across both the high pressure and the low pressure turbines, although the result desired can be achieved by making the diaphragm responsive to the pressure drop across the low pressure turbine.

Conduit 126 contains orifice 130 therein, the area of the orifice being controlled by needle valve 132. The position of the needle valve in the orifice determines the area of the orifice and, thus, the effect of turbine inlet pressure in chamber 120. Face 134 on the needle valve may be contoured to obtain either a linear or a non-linear schedule of pressure ratio with respect to the position of the needle valve in the orifice. The needle valve is connected to link 136 which in turn is connected by link 138 to power lever 140. Movement of the power lever rotates link 136 about fixed pivot 142 to adjust the position of needle valve 132 and regulate the area of orifice 130.

One wall of chamber 120 contains orifice 144 therein through which the turbine inlet pressure in the chamber flows to atmosphere. Needle valve 146, connected at one end to diaphragm 116 and at its opposite end to one end of link 112, controls the area of the orifice as a function of the pressure differential across the diaphragm. Face 148 on the needle valve may be contoured to obtain either a linear or a non-linear schedule of needle valve displacement with respect to turbine pressure ratio.

Pressure ratio controller 98 is a microjet control the principle of which is explained in Society of Automotive Engineers Preprint No. 612 titled A New Approach to Turbojet and Ramjet Engine Control.

Displacement of diaphragm 116 and needle valve 146 in accordance with a difference in pressures between chambers 118 and 120 rotates link 112 about relatively fixed pivot 150 to move sleeve 78 in afterburner fuel control 60 axially to vary the effective area of metering ports 74 and 80 and regulate fuel flow to the afterburner accordingly. The position of relatively fixed pivot 150 is a function of compressor inlet total temperature and is determined by cam slot 151 in slideable block 152. The block is connected by rod 153 to the free end of liquid filled bellows 154. The interior of the bellows is connected by conduit 156 with temperature responsive bulb 158 mounted in power plant inlet 12 so as to sense total temperature within the inlet. Variations in inlet temperature expand or contract bellows 154 to slide block 152 and displace pivot 150 vertically as a function of compressor inlet temperature.

In addition to being shiftable axially as a function of turbine pressure ratio, movable sleeve 78 is rotatable as a function of a power plant pressure. In the arrangement shown the rotational position of the sleeve is a function of compressor discharge pressure. This pressure is used to provide a proportionality between fuel flow and air flow, the latter being a function of pressure. The sleeve has integral therewith pinion 160 on stem 110, the pinion meshing with rack 162. The rack is connected by rod 164 to the free end of bellows 166, the opposite end of the bellows being connected to fixed surface 168. Pressure station 170 located in the combustion section inlet downstream of the last stage of high pressure compressor rotor 16 is connected by conduit 172 to the interior of bellows 166 so that variations in compressor discharge pressure cause expansion or contraction of the bellows and longitudinal movement of rack 162. This in turn rotates sleeve 78 to vary the area of metering ports 74 and 80 as a function of compressor discharge pressure, and, consequently, as a function of airflow. Coupling 174 permits rotational movement of the sleeve with respect to its pressure ratio controller linkage. It is to be noted that compressor discharge pressure is essentially the same as the pressure within combustion section 18, and that the pressure sometimes is referred to as burner case pressure.

Movement of power lever 140 schedules the area of exhaust nozzle 26 at the same time that it establishes a pressure ratio across low pressure turbine 22. Link 138 between the power lever and pressure ratio controller 98 is connected at an intermediate portion to a servo mechanism regulating the position of eyelids 36. Movement of the power lever rotates link 176, connected to link 138, about relatively fixed pivot 178, the position of the pivot being a function of the total temperature at the power plant inlet. Roller 180 is mounted on the top end of link 176 and is in contact with cam 182 connected to the free end of liquid filled bellows 184, the opposite end of the bellows being secured to fixed surface 186. Conduit 188 connects the interior of the bellows with temperature responsive bulb 189, similar to bulb 158, mounted in power plant inlet 12 so as to sense total temperature within the inlet. Variations in inlet temperature expand or contract bellows 184 to move cam 182 and adjust the position of pivot 178 as well as vary exhaust nozzle area as a function of compressor inlet temperature. The effect of variations in compressor inlet temperature upon the pivot point and upon nozzle area may be determined by the contouring of the surface of cam 182 in contact with roller 180.

Rotation of link 176 about pivot 178 as a result of movement of power lever 140, or about pivot 190 as a result of expansion or contraction of temperature responsive bellows 184, moves pilot valve 192 in servo motor 194, the pilot valve being connected to link 176 at a point between the ends of the link. The pilot valve has a series of lands, 196, 198, 210 and 212 thereon, the lands controlling the admission of a suitable pressure to opposite sides of piston 214 for moving the piston. In this embodiment compressor discharge pressure is used as the moving force. Branch conduit 216 is connected to compressor discharge conduit 172 and through it, or through a similar connection, compressor discharge pressure is admitted to chamber 218 in casing 220 of the servo motor. Movable sleeve 222 surrounds pilot valve 192 and port 224 in the sleeve provides communication between chamber 218 and chamber 226 defined between lands 198 and 210 on the pilot valve. Movement of the pilot valve to the left uncovers port 228 in the sleeve to admit compressor discharge pressure through passage 230 to chamber 232 at the left of piston 214. At the same time chamber 234 at the right of the piston is connected through passage 236, port 238 in sleeve 222, and the groove between lands 210 and 212 with vent conduit 240. The pressure in chamber 232 moves piston 214 to the right, which movement, through suitable linkage including rod 242 connected to piston 214 and rod 244 connected to eyelids 36, closes the eyelids and decreases the area of exhaust nozzle 26. Movement of pilot valve 192 to the right admits compressor discharge pressure from chamber 218 through port 238 and passage 236 to chamber 234, and vents chamber 232 through passage 230, port 228 and the groove between lands 196 and 198 to vent conduit 246. The pressure in chamber 234 will move piston 214 to the left to increase the area of exhaust nozzle 26.

Movable sleeve 222 is part of a "follow-up" mechanism, commonly provided for servo motors such as servo motor 194. The right end of the sleeve is connected by link 248, pivoted about its middle at pivot 250, to rod 242 on piston 214. Because of this connection between the sleeve and the piston the sleeve always moves when the piston is moved, but in an opposite direction. Thus, when pilot valve 192 is moved to the right, piston 214 moves to the left and, at the same time, sleeve 222 moves to the right. Movement of both the piston and the sleeve terminates when ports 228 and 238 in the sleeve are aligned with lands 198 and 210 on pilot valve 192. At this time the servo motor is in equilibrium.

A maximum fuel flow limit for the afterburner should be provided since a point is reached in the afterburner combustion above which an increased fuel/air ratio reduces afterburner temperature, thereby decreasing afterburner thrust and increasing the pressure drop across the low pressure turbine rotor. In the embodiment shown, adjustable bolt 252 acting against shoulder 254 on stem 110 of sleeve 78 provides a maximum fuel flow limit. The maximum effective area of metering ports 74 and 80 cannot increase beyond a point where shoulder 254 contacts bolt 252. A minimum fuel flow limit also should be provided since combustion cannot be supported in the afterburner when the fuel/air ratio is reduced beyond the limit which supports combustion. Adjustable bolt 256 is provided to limit the minimum fuel flow to the afterburner, the bolt acting against the top edge of sleeve 78 to limit the minimum effective area of the metering ports.

As stated above, afterburner fuel metering ports 74 and 80 are rectangular in shape. Therefore, for a given axial position of sleeve 78 the ratio of the effective metering area to the rotation of the sleeve as caused by compressor discharge pressure responsive bellows 166 is constant. Since a constant pressure drop is maintained across the metering ports, and since rotation of sleeve 78 is proportional to compressor discharge pressure, the ratio of afterburner fuel flow to compressor discharge pressure also is constant for a given axial position of sleeve 78. In the power plant operating range where afterburning normally is accomplished, air flow is essentially proportional to compressor discharge pressure. Therefore, it may be said that each axial position of sleeve 78 represents a constant afterburner fuel/air ratio with downward movement of sleeve 78 increasing the fuel/air ratio and upward movement of the sleeve decreasing the fuel/air ratio.

*Operation*

When any airplane using power plant 10 is ready for take off, power lever 140 is moved to its maximum counterclockwise position and afterburner 24 is set in operation. This position of the power lever establishes the area of the exhaust nozzle through servo motor 194 and selects a turbine pressure ratio through pressure ratio controller 98. As the airplane forward speed increases the temperature of the air at inlet 12 increases and the characteristics of the power plant are such that the speed of the ungoverned low pressure spool tends to decrease with the increase in temperature. However, by virtue of inlet temperature responsive bellows 184 and 154, a change in inlet temperature will result in changes in exhaust nozzle area and afterburner fuel flow, which area and fuel flow changes tend to hold actual or corrected low pressure spool speed substantially constant, or at a predetermined level as a function of inlet temperature.

The temperature increase in inlet 12 is sensed by temperature responsive devices such as bulbs 158 and 189 which cause bellows 184 and bellows 154 to expand. Expansion of bellows 184 rotates link 176 in a clockwise direction about pivot 190 to move pilot valve 192 to the right and admit compressor discharge pressure from chamber 218 to chamber 234 at the right of piston 214. At the same time chamber 232 at the left of the piston is vented. The pressure in chamber 234 moves the piston to the left to open eyelids 36 and increase the area of exhaust nozzle 26. As the piston moves to the left, sleeve 222 is moved to the right and finally ports 228 and 238 in the sleeve are cut off by lands 198 and 210, respectively, on the pilot valve. When this occurs, movement of the piston is stopped and there is no further increase of exhaust nozzle area.

A decrease in the pressure within afterburner 24 results as exhaust nozzle area increases. The decreased pressure tends to increase the pressure ratio across turbine rotors 20 and 22, which pressure ratio is being held constant by pressure ratio controller 98. However, the decreased afterburner pressure is reflected in chamber 118 of the controller and results in upward movement of needle valve 146 and counterclockwise rotation of link 112 about relatively fixed pivot 150. This rotation of the link, assuming pivot 150 remains fixed, moves afterburner fuel control sleeve 78 downward to increase the effective area of metering ports 74 and 80 and increase fuel flow to the afterburner. Increased fuel flow increases the pressure within afterburner 24 and tends to restore turbine pressure ratio to its selected value.

If, at the maximum counterclockwise power lever position, turbine pressure ratio were to be held constant after an increase in exhaust nozzle area as the result of an increase in inlet temperature, low pressure spool speed may deviate from the predetermined value giving best power plant performance. To assure optimum performance of the power plant it is required that low pressure spool speed be held within certain limits. Compensation, therefore, is provided to keep low pressure spool speed constant or at a predetermined value under the stated conditions. This compensation is in bellows 154 which expands with the increase in inlet temperature to move the position of relatively fixed pivot 150 upward and oppose the input to sleeve 78 from pressure ratio controller 98 caused by the decreased pressure in chamber 118. Thus, the increase of afterburner fuel flow is not as great as it would be if pivot 150 were fixed. The overall effect, as determined by the contouring of cam slot 151 is to bias the selected turbine pressure ratio so that low pressure spool speed and inlet temperature have a desired relationship.

The control permits optimum operation at partial afterburning while holding the speed of the high pressure spool at its rated value by reducing exhaust nozzle area directly and holding turbine pressure ratio constant through regulation of afterburner fuel flow.

If, during afterburner operation of the power plant, decreased afterburning thrust is desired, power lever 140 is moved in a clockwise direction to a new position. Link 138 is moved to the left by the power lever which movement rotates link 176 about pivot 178 to move servo motor pilot valve 192 to the left and decrease exhaust nozzle area, and rotates link 136 about pivot 142 to move pressure ratio controller needle valve 132 to the left and decrease the pressure in chamber 120.

The movement of the pilot valve admits compressor discharge pressure from chamber 218 to chamber 232 at the left of piston 214. At the same time, chamber 234 at the right of the piston is vented. The pressure in chamber 232 moves the piston to the right to close eyelids 36. As piston 214 moves to the right, sleeve 222 is moved to the left to restore equilibrium in the servo motor. Movement of the piston then is stopped and there is no further closing of the eyelids. Exhaust nozzle area will be that scheduled by the new position of the power lever.

The movement of the needle valve reduces the area of orifice 130 to decrease the pressure in chamber 120 of the pressure ratio controller and upset the balance across diaphragm 116. Needle valve 146 attached to the diaphragm is moved downward to rotate link 112 clockwise and move afterburner fuel control sleeve 78 upward, decreasing the effective area of metering ports 74 and 80 and decreasing fuel flow to the afterburner through delivery conduit 64.

As eyelids 36 close and exhause nozzle area decreases, static pressure in the afterburner tends to increase which normally would increase the pressure in chamber 118 of the pressure ratio controller. However, the reduced fuel flow to the afterburner resulting from the pressure unbalance across diaphragm 116 reduces the static pressure in the afterburner to counteract the tendency of the static pressure to rise as nozzle area decreases. Thus the pressure in chamber 118 of the pressure ratio controller, which tends to increase as the eyelids close, decreases as afterburner fuel flow decreases.

Afterburner fuel flow continues to be reduced until the pressures in pressure ratio controller chambers 118 and 120 are balanced at which time the selected turbine pressure ratio will have been established. Since the speed of the low pressure spool is a function of the pressure ratio across the turbines, particularly turbine rotor 22, the pressure ratio controller may be designed, through the contouring of needle valve face 134, to hold spool speed constant during afterburning operation or to maintain the speed at some predetermined level.

Thus, decreased afterburner thrust for partial afterburning operation is obtained by reducing exhaust nozzle area and afterburner fuel flow, while at the same time low pressure spool speed is governed through control of turbine pressure ratio.

If increased afterburner thrust is desired during partial afterburning operation, power lever 140 is moved in a counterclockwise direction. This movement increases the area of exhaust nozzle 26 and increases the area of orifice 130 in pressure ratio controller 98. The decrease in the pressure in pressure ratio controller chamber 118 resulting from the nozzle area increase and the increased pressure in chamber 120 resulting from the increased area of orifice 130 moves diaphragm 116 upward and, by virtue of its connection with sleeve 78, increases fuel flow to the afterburner. Fuel flow to the afterburner is increased until the pressure sensed by chamber 118 balances the pressure in chamber 120. At this point equilibrium has been established in the pressure ratio controller and further increase of the effective area of metering ports 74 and 80 is terminated. The selected turbine pressure ratio will have been restored and low pressure spool speed will have been maintained.

By means of the control increased afterburner thrust for partial afterburning operation is obtained by increasing exhaust nozzle area and afterburner fuel flow at a substantially constant turbine pressure ratio.

For the purpose of simplification power plant operating variable responsive devices such as bellows 154, 166 and 184 are shown as directly connected to elements of the control which are moved in response to changes in the variables. In actual construction of the control, force amplifiers such as servo motors would be interposed between the variable responsive devices and the control elements. Such arrangements are well known in the art.

It is to be understood that the invention is not limited to the specific embodiment here illustrated and described, but may be used in other ways without departure from its spirit as defined by the following claims.

I claim:

1. A twin spool gas turbine power plant having a high pressure spool including a compressor rotor and a turbine rotor, a low pressure spool including a compressor rotor and a turbine rotor, an afterburner, fuel supply means for said afterburner, metering means in said fuel supply means controlling fuel flow to said afterburner, said metering means including cooperating parts capable of relative axial and rotational movement with respect to each other for varying the effective metering area, an exhaust nozzle for said afterburner, and means for varying the area of said nozzle, in combination with a manually operated power lever, means operatively connected to and controlled by said lever for actuating said nozzle area varying means, temperature responsive means operatively connected to said nozzle area varying means for biasing the area of said nozzle as a function of the temperature of air entering said power plant, pressure ratio sensing means associated with said low pressure turbine rotor and operatively connected with one of said metering parts for imparting one of said movements thereto for varying fuel flow as a function of low pressure turbine rotor pressure ratio, pressure responsive means operatively connected with one of said metering parts for imparting the other of said movements thereto for varying fuel flow as a function of an engine operating pressure, means operatively connected to said pressure ratio sensing means for varying the selection of pressure ratio across said low pressure turbine rotor, and means operatively connected to said lever for adjusting said pressure ratio selection varying means.

2. A twin spool gas turbine power plant having a high pressure spool including a compressor rotor and a turbine rotor, a low pressure spool including a compressor rotor and a turbine rotor, an afterburner, fuel supply means for said afterburner, metering means in said fuel supply means controlling fuel flow to said afterburner, said metering means including cooperating parts capable of relative axial and rotational movement with respect to each other for varying the effective metering area, an exhaust nozzle for said afterburner, and means for varying the area of said nozzle, in combination with a manually operated power lever, means operatively connected to and controlled by said lever for actuating said nozzle area varying means, pressure ratio sensing means associated with said low pressure turbine rotor and operatively connected with one of said metering parts for imparting one of said movements thereto for varying fuel flow as a function of low pressure turbine rotor pressure ratio, pressure responsive means operatively connected with one of said metering parts for imparting the other of said movements thereto for varying fuel flow as a function of an engine operating pressure, temperature responsive means operatively connected to said metering means for biasing the area of said metering means as a function of the temperature of air entering said power plant, means operatively connected to said pressure ratio sensing means for varying the selection of pressure ratio across said low pressure turbine rotor, and means operatively connected to said lever for adjusting said pressure ratio selection varying means.

3. A twin spool gas turbine power plant having a high pressure spool including a compressor rotor and a turbine rotor, a low pressure spool including a compressor rotor and a turbine rotor, an afterburner, fuel supply means for said afterburner, metering means in said fuel supply means controlling fuel flow to said afterburner, said metering means including cooperating parts capable of relative axial and rotational movement with respect to each other for varying the effective metering area, an exhaust nozzle for said afterburner, and means for varying the area of said nozzle, in combination with a manually operated power lever, means operatively connected to and controlled by said lever for actuating said nozzle area varying means, temperature responsive means operatively connected to said nozzle area varying means for biasing the area of said nozzle as a function of the temperature of air entering said power plant, pressure ratio sensing means associated with said low pressure turbine rotor and operatively connected with one of said metering parts for imparting one of said movements thereto for varying fuel flow as a function of low pressure turbine rotor pressure ratio, pressure responsive means operatively connected with one of said metering parts for imparting the other of said movements thereto for varying fuel flow as a function of an engine operating pressure, temperature responsive means operatively connected to said metering means for biasing the area of said metering means as a function of the temperature of air entering said power plant, means operatively connected to said pressure ratio sensing means for varying the selection of pressure ratio across said low pressure turbine rotor, and means operatively connected to said lever for adjusting said pressure ratio selection varying means.

(References on following page)

References Cited in the file of this patent

UNITED STATES PATENTS

| | | |
|---|---|---|
| 2,641,324 | Fortescue | June 9, 1953 |
| 2,645,240 | Drake | July 14, 1953 |
| 2,693,080 | Hutchinson | Nov. 2, 1954 |
| 2,693,674 | Anxionnaz | Nov. 9, 1954 |
| 2,736,166 | Mock | Feb. 28, 1956 |
| 2,746,242 | Reed | May 22, 1956 |
| 2,753,685 | Mattinson | July 10, 1956 |
| 2,754,658 | Farkas | July 17, 1956 |
| 2,778,191 | Thompson | Jan. 22, 1957 |
| 2,780,054 | Coar et al. | Feb. 5, 1957 |
| 2,789,417 | Kuzmitz | Apr. 23, 1957 |
| 2,814,928 | Davies et al. | Dec. 3, 1957 |
| 2,818,703 | Victor | Jan. 7, 1958 |
| 2,844,936 | Fowler et al. | July 29, 1958 |
| 2,873,576 | Lombard | Feb. 17, 1959 |
| 2,933,887 | Davies | Apr. 26, 1960 |

(U.S. Corresponding to French Patent 1,108,176)

FOREIGN PATENTS

| | | |
|---|---|---|
| 1,108,176 | France | Aug. 24, 1955 |